Oct. 7, 1969　　　　　　B. P. NOBLE　　　　　3,471,728
DYNAMOELECTRIC APPARATUS
Filed April 4, 1966

Bruce P. Noble
INVENTOR
BY Kolisch + Hartwell
Attys.

United States Patent Office

3,471,728
Patented Oct. 7, 1969

3,471,728
DYNAMOELECTRIC APPARATUS
Bruce P. Noble, 6017 College Ave.,
Oakland, Calif. 94618
Filed Apr. 4, 1966, Ser. No. 539,854
Int. Cl. H02k 21/22
U.S. Cl. 310—154          8 Claims

ABSTRACT OF THE DISCLOSURE

An apparatus adapted for use as a motor or generator, in which an armature is constructed from non-magnetic material for substantially reduced hysteresis loss and includes one or more hollow cylindrical drums concentrically mounted about the rotational axis of the armature with electrical conductors affixed to the non-magnetic drums for providing the armature windings. In cooperation with the armature unit, a field producing structure is provided and includes opposed pole faces located closely adjacent radially opposite faces of the drums to pass a uniform magnetic field thereacross intercepting the drums and armature windings.

---

The present invention relates to dynamoelectric apparatus, and more particularly, to such apparatus which may be employed either as an electric motor or generator.

In many known motors and generators there is magnetic field structure which is stationary and an armature which rotates relative to the field structure. Typically, the field structure and armature are each constructed from a magnetic material. The field structure is employed to produce a magnetic field which creates a magnetic flux, and the armature carries conductive windings and cooperates with the field structure to form a magnetic circuit in which such flux flows. As the armature rotates relative to the field structure, every region within the armature experiences a periodic reversal of the direction in which the magnetic flux produced by the field passes therethrough, and, due to the nature of known magnetic materials, this results in a hysteresis loss (a power loss) in the armature material. Such a loss reduces the efficiency of the apparatus and thus is undesirable.

A general object of the invention, therefore, is to provide novel dynamoelectric apparatus wherein hysteresis loss of the type described is substantially reduced.

More particularly, an object of the invention is to provide such apparatus which includes magnetic field structure, and an armature which rotates relative to the field structure, where the armature is constructed from non-magnetic material thus to prevent any hysteresis loss from occurring therein.

A further object is to provide novel armature and field structures wherein the armature is constructed from non-magnetic material and includes elongated hollow cylindrical drums which are concentric and nested one with another, and which rotate with the armature about their longitudinal axis, and which carry conductors for electric current, and the field structure is constructed from magnetic material and includes opposed pole faces located between axially opposite ends of the armature drums and which are disposed closely adjacent radially opposite sides of each drum. These opposed pole faces define air gaps wherein there exists a relatively uniform magnetic field. With such construction, on rotation of the armature, the conductors carried on the armature drums move through the air gaps between the pole faces, and thus are enabled to move through a magnetic field without there being any magnetic material also moving through the field.

Another object of the invention is to provide apparatus of the type so far described wherein the number of drums included in the armature structure may readily be varied in order to adapt the apparatus to meet various power requirements.

Yet another object is to provide such apparatus which is relatively simple to construct.

These and other objects and advantages attained by the invention will become more fully apparent as the description which follows is read in conjunction with the accompanying drawings, wherein.

Figures 1, 2:
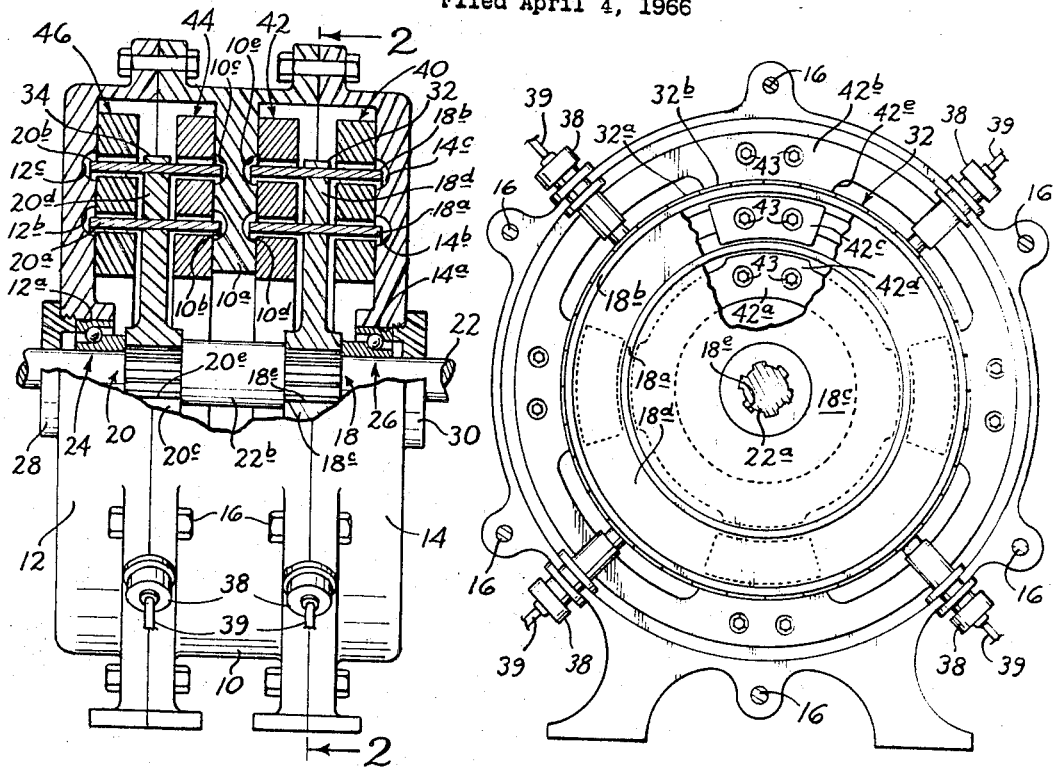
FIG. 1 is a side elevation, partly in cross section, illustrating dynamoelectric apparatus constructed according to the invention.
FIG. 2 is a cross-sectional view taken along the line 2—2 in FIG. 1.

Turning now to the drawings, and referring first to FIGS. 1 and 2, the apparatus shown comprises an elongated somewhat cylindrical housing having a central section 10 and a pair of end sections 12, 14. These three sections are joined together by suitable nut and bolt assemblies, such as assemblies 16.

End sections 12, 14 are substantially identical in construction, and referring for a moment particularly to section 12, it includes a central bore 12a in the end thereof and a pair of inwardly facing annular channels 12b, 12c, with channel 12c curving about a greater radius than channel 12b. End section 14 has a central bore 14a which corresponds to bore 12a, and a pair of annular channels 14b, 14c which correspond to channels 12b, 12c, respectively.

Central section 10 of the housing has an annular portion 10a which extends radially inwardly toward the interior of the housing. In opposite faces of this annular portion, and as can be seen clearly in FIG. 1, are annular channels 10b, 10c (in the left face), and channels 10d, 10e (in the right face). Channels 10b, 10d curve about the same radius as previously mentioned channels 12b, 14b, and channels 10c, 10e curve about the same radius as previously mentioned channels 12c, 14c.

Mounted for rotation within the housing is a non-magnetic armature structure, which may be made of plastic or like material. The structure includes, in the embodiment illustrated, a pair of armature units, indicated generally at 18, 20.

Referring to armature unit 18, this unit comprises a pair of elongated hollow cylindrical drums 18a, 18b which are concentric, with drum 18a nested within drum 18b. These drums have relatively thin walls measured in a radial direction. Drum 18a is supported on a cylindrical hub 18c which fits within the hollow interior of the drum and which is suitably joined thereto. Drum 18b is supported by an annular ring member 18d which fits between the outer surface of drum 18a and the inner surface of drum 18b and which is suitably joined to the two drums. Hub 18c and ring 18d lie in substantially a common plane which is normal to the axis of rotation of armature unit 18, and the drums extend from axially opposite sides of the hub and ring. As can be seen clearly in FIG. 2, hub 18c includes a grooved axial bore 18e.

In the preferred embodiment described, hub 18c, ring 18d, and the two drums of armature unit 18 are constructed as separate pieces which are joined together to form the complete armature unit. If desired, it is possible, of course, to construct the armature unit as an integral piece rather than from separate parts.

Armature unit 20 is similar in construction to armature unit 18, with drums 20a, 20b corresponding to drums 18a, 18b, with hub 20c corresponding to hub 18c, and with annular ring 20d corresponding to annular ring 18d, respectively. Hub 20c has a bore 20e which corresponds to bore 18e.

The two armature units are mounted for simultaneous rotation on an elongated shaft 22 which has splined portions, such as portion 22a (illustrated in FIG. 2), which match with grooved bores 18e, 20e. The shaft has an enlarged central portion 22b forming annular shoulders against which hubs 18c, 20c abut with the armature units mounted in place. This central portion serves to space the armature units axially apart by the desired distance so that they are positioned properly within the housing. As can be seen in FIG. 1, with the armature units properly mounted on the shaft, drums 18a, 18b extend axially into channels 10d, 14b and 10e, 14c, respectively, in housing sections 10, 14 and drums 20a, 20b extend axially into channels 10b, 12b and 10c, 12c, respectively, in housing sections 10, 12.

Shaft 22 is supported in bearings 24, 26 which fit within bores 12a, 14a, respectively, in the end sections of the housing. These bearings abut hubs 18c, 20c, and are held in place by locking rings 28, 30 which are threaded into the outer ends of bores 12a, 14a, respectively.

The apparatus further comprises circuit means, taking the form of commutator rings, which enable the apparatus to be employed as a direct current machine. It will be apparent to those skilled in the art, however, that the apparatus may easily be adapted for use as an alternating current machine simply by replacing these commutator rings with slip rings. These rings, shown at 32, 34, are suitably fastened to the peripheries of drums 18b, 20b, respectively, and are located centrally between axially opposite ends of the drums. The commutator rings each comprise multiple conductive segments, such as segments 32a, 32b, illustrated in FIG. 2 for commutator ring 32.

Figure 3:
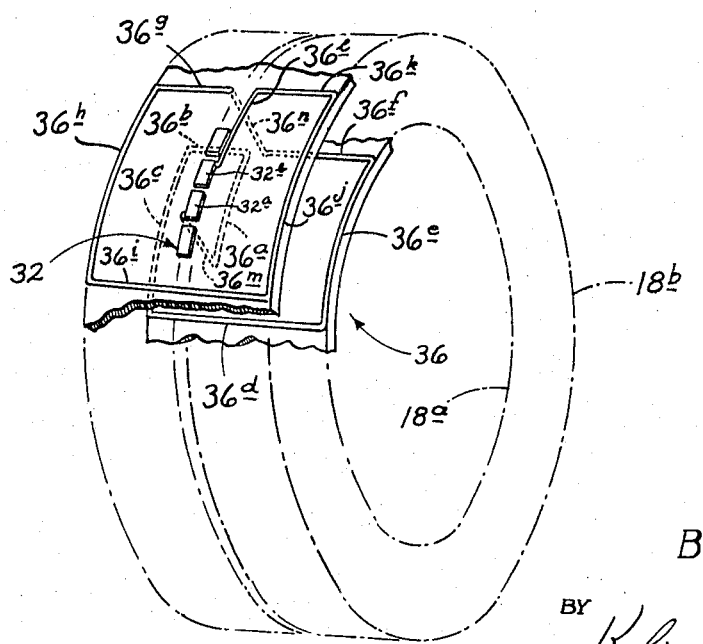
FIG. 3 is a schematic diagram illustrating a conductive winding employed in the apparatus of FIGS. 1 and 2.

Connected to the various segments of a commutator ring, and suitably mounted or wound on the armature unit mounting the ring, is conducting means, more specifically multiple windings such as winding 36 in FIG. 3, for carrying electrical current. As will be apparent to those skilled in the art, there are a number of ways in which these windings may be wound on an armature unit. In FIG. 3, one type of mounting for a winding is illustrated in simplified form. Referring to the figure, the winding is shown wound on the two drums of an armature unit with its ends connected to commutator ring segments 32a, 32b. The winding includes reaches 36a to 36f which extend over drum 18a, reaches 36g to 31l which extend over drum 18b, and reaches 36m, 36n which extend radially between the two drums and through suitable accommodating openings in the drums. In order to simplify FIG. 3, only one winding and four commutator ring segments are illustrated. The other windings of a conducting means are wound similarly to the winding specifically illustrated, with ends of the windings joined to adjacent segments of the commutator ring. In the case of two directly adjacent windings, an end of each of the windings is joined to a common commutator ring segment, and opposite ends of the windings are joined to segments on either side of this common segment.

Turning again to FIGS. 1 and 2, the apparatus includes brush assemblies 38 which are suitably mounted in the housing and permit electrical connections to be made through the commutator rings to the windings on the armature units as the armature units rotate in the housing. In the embodiment shown, four brush assemblies are provided for each armature unit. Conductors 39 are connected to these brush assemblies for delivering current to or receiving current from the apparatus.

The apparatus further includes magnetic field structure for producing a suitable magnetic field. This field structure comprises paired field units indicated generally at 40, 42, and at 44, 46. As can be seen in FIG. 1, field unit 40 is mounted on end section 14 of the housing, field units 42, 44 are mounted on axially opposite sides of central section 10 of the housing, and field unit 46 is mounted on end section 12 of the housing. Each field unit is substantially identical in construction, and for purposes of simplification herein, only one of these field units, namely unit 42, will be described in detail.

Referring particularly to FIGS. 1 and 2, field unit 42 comprises inner and outer concentric ring-shaped magnets 42a, 42b, and four circumferentialy distributed coupler magnets, such as magnet 42c (shown at the top of FIG. 2), which are disposed radially intermediate magnets 42a, 42b. Since four field coupler magnets are employed in the apparatus illustrated, what is called a four pole machine results. These field and coupler magnets are fastened to housing section 10 by means of bolts 43.

Formed integrally with magnet 42b are pole projections 42e with faces facing radially inwardly and opposite radially outwardly facing faces in coupler magnets 42c. Formed integrally with magnet 42a are pole projections 42d. These projections have radially outwardly facing faces which are opposite radially inwardly facing faces in coupler magnets 42c. A flux field is established extending between the various faces which face one another. The construction contemplates an air gap between opposed pole faces through which the windings move on rotation of the drums. It should be noted, however, that the air gap has minimal thickness which results in a uniform strong flux field existing between opposed pole faces.

Referring to FIG. 1, the pole faces of field unit 42 are paired with corresponding pole faces in field unit 40, with the pole faces in units 40, 42 being located adjacent axially opposite ends of the drums of armature unit 18. Field units 44, 46 are substantially the same in construction as field units 40, 42, and are positioned relative to armature unit 20 in substantially the same way that field units 40, 42 are positioned relative to armature unit 18.

While in the preferred embodiment illustrated the various field units are disclosed as made up of permanent magnets so that they produce a magnetic field in the air gaps at all times, it should be apparent that electromagnets could be substituted for these permanent magnets.

Considering now how the apparatus described operates, when it is used, as a motor, current is introduced into conductors 39 connected to brush assemblies 38, whereby current is fed through the commutator ring segments into the windings mounted on the armature units. With such current flowing in the windings which are located in the magnetic field in the air gaps, a force is produced on those windings as is well understood, and this force causes the armature units to rotate which results in shaft 22 turning.

When the apparatus is operated as a generator, a mechanical drive from a suitable source, such as a motor or engine, is applied to shaft 22 in order to turn the shaft and thereby to turn the armature units. With movement of the windings through the magnetic field in the air gaps, a voltage is generated which is transmitted to conductors 39 through the commutator rings and brush assemblies.

Since the materials used in constructing the armature units are non-magnetic, when the apparatus operates either as a motor or as a generator there is no movement of magnetic material through a magnetic field which would result in a hysteresis power loss in the armature units. Thus, the apparatus avoids a power loss which occurs in many known electric motors and generators. With the walls of the armature unit drums being relatively thin, and with the pole faces being disposed closely adjacent opposite sides of these walls, a relatively narrow air gap exists between the opposed pole faces. This results in a relatively uniform magnetic flux density existing in the air gaps, and this is important to efficient operation.

Additionally, since each armature unit includes at least two drums which carry conductive windings, it is possible to have a relatively large number of windings constantly passing through the air gaps as the apparatus operates, and this also is important in obtaining efficient operation.

If it is desired to vary the power characteristics of the apparatus, the armature units may easily be constructed with more than two concentric drums, thus to enable more windings to be mounted on each unit. Furthermore, the apparatus may be constructed with more than two axially aligned armature units. Also, it is possible to construct apparatus having a pole configuration different from the four pole configuration which is illustrated herein.

These and other modifications and variatiions may become apparent to those skilled in the art, and may be made without departing from the spirit of the invention, and it is desired to cover all such variations and modifications which come within the scope of the appended claims.

It is claimed and desired to secure by Letters Patent:

1. Dynamoelectric apparatus comprising:
   a housing,
   an armature unit mounted for uninterrupted relative rotation with respect to said housing having a hollow cylindrical drum formed of non-magnetic material,
   magnetic field structure fastened to said housing having opposed pole faces disposed adjacent radially opposite sides of said drum,
   conductor means mounted on said drum with portions of said conductor means passing between said opposed pole faces on such relative rotation, and
   circuit means operatively connected to said conductor means, accommodating flow of current in said conductor means upon relative rotation of said armature unit with respect to said housing.

2. The apparatus defined in claim 1, said armature unit comprising, an additional hollow cylindrical drum formed of a non-magnetic material mounted concentrically of and nested within said first named drum for joint rotation therewith relative to said housing, and said structure being formed and disposed with opposed pole faces adjacent radially opposite sides of each said drum.

3. The apparatus defined in claim 2, said structure comprising, a pair of ring-shaped magnetic members disposed concentrically with said drum radially exterior and radially interior thereof respectively, and a plurality of magnetic coupler members disposed at circumferentially spaced locations between said drums coupling magnetic fields between said ring members in paths radially intercepting both said drums.

4. The apparatus of claim 2, wherein said conductor means comprises multiple windings, with each winding having reaches mounted on each of said drums.

5. The apparatus of claim 4, wherein said armature unit includes drum support structure for each said drum extending radially relative to the axis of rotation of said armature unit and being formed of non-magnetic material, and each drum and each winding thereon extends from axially opposite sides of its support structure.

6. The apparatus of claim 5, wherein said drum support structures lie in a substantially common plane which is normal to the axis of rotation of said armature unit, and said pole faces are grouped in pairs with the pole faces in each pair located adjacent axially opposite sides of said common plane.

7. The apparatus of claim 6, wherein said circuit means comprises, a contact ring mounted to the radially outermost said drum circumferentially extending about the outer periphery thereof intermediate its axial ends and being connected to said winding means, and brush means mounted to said housing for engaging said contact ring.

8. The apparatus of claim 2 which further comprises, a second armature mounted for joint coaxial rotation with the first named armature within said housing and having a pair of hollow cylindrical drums formed of non-magnetic material and being concentric and nested one within the other, opposed pole faces in said magnetic field structure disposed adjacent radially opposite sides of each drum in said second armature unit, conductor means mounted on said second armature unit drums to rotate therewith on rotation of said second armature unit with portions of said conductor means passing between said second mentioned opposed pole faces on such rotation, and circuit means operatively connected to said conductor means accommodating the flow of current in said conductor means on rotation of said second armature unit.

References Cited

UNITED STATES PATENTS 2,864,016  12/1958  Waltscheff _____ 310—211

FOREIGN PATENTS 95,091  8/1960  Holland.

WARREN E. RAY, Primary Examiner

R. SKUDY, Assistant Examiner

U.S. Cl. X.R.
310—177, 211, 231